United States Patent [19]

Nishimura et al.

[11] 4,400,974
[45] Aug. 30, 1983

[54] INTAKE AIR AMOUNT DETECTING SYSTEM FOR INTERNAL COMBUSTION ENGINES

[75] Inventors: Yutaka Nishimura; Yoshishige Oyama, both of Katsuta; Tadashi Kirisawa, Hitachi; Hiroshi Kuroiwa, Hitachi; Minoru Osuga, Hitachi; Yasunori Mouri, Katsuta, all of Japan

[73] Assignee: Hitachi, Ltd., Tokyo, Japan

[21] Appl. No.: 285,278

[22] Filed: Jul. 15, 1981

[30] Foreign Application Priority Data

Jul. 15, 1980 [JP] Japan .................................. 55-97324

[51] Int. Cl.³ ............................................ G01M 15/00
[52] U.S. Cl. ........................................ 73/118; 73/204
[58] Field of Search .................. 73/118, 204; 123/472, 123/478

[56] References Cited

U.S. PATENT DOCUMENTS 4,311,042 1/1982 Hosoya et al. .......................... 73/118

*Primary Examiner*—Jerry W. Myracle

*Attorney, Agent, or Firm*—Antonelli, Terry & Wands

[57] ABSTRACT

An intake air amount detecting system which comprises:
a temperature-dependent resistor disposed in an intake air path of an internal combustion engine;
a sensor control circuit which feeds a heating current to the temperature-dependent resistor, which detects the change in resistance of the temperature-dependent resistor, which amplifies the detected signal, which effects the compensation depending upon the temperature of the intake air, and which controls the heating current in order to maintain the temperature of the temperature-dependent resistor constant; and
an operation circuit which converts a signal that represents the heating current into an intake air flow rate;
wherein the sensor control circuit is provided with a response-adjusting circuit which delays the response of the heating current only when the intake air flow rate decreases.

8 Claims, 11 Drawing Figures

INTAKE AIR AMOUNT DETECTING SYSTEM FOR INTERNAL COMBUSTION ENGINES

BACKGROUND OF THE INVENTION

The present invention relates to an intake air amount detecting system employing a temperature-dependent resistor which is electrically heated.

In a system disclosed in U.S. Pat. No. 3,747,577, a temperature-dependent resistor is disposed in an intake air path of the engine, and is connected as one arm of a bridge circuit. A diagonal point of the bridge circuit is connected to the input terminal of an amplifier, and the electric current for heating the resistor is controlled by the output of the amplifier. Namely, the resistor also serves as a sensor for detecting its own temperature. The change in the temperature of the resistor caused by the change in the air flow velocity is detected in the form of change in balance of the bridge circuit. Therefore, the heating circuit is controlled, and the temperature of the resistor is adjusted to remain constant. With this arrangement, the output of the amplifier is used as a signal which represents the intake air flow rate to control the fuel injection of the engine.

In the intake air amount detecting system of the type mentioned above, the response characteristics for producing the detection signal that represents the intake air flow rate vary depending upon the thermal capacity of the sensor unit formed by the temperature-dependent resistor. However, if the mechanical strength and durability of the sensor are taken into consideration, there is a limit to which the thermal capacity of the sensor can be reduced. Especially, if the sensor is constructed to be very durable so that the resistor will not be damaged even when the engine develops a back-fire, the thermal capacity of the sensor becomes so great as to create a problem with regard to the response characteristics of the sensor.

SUMMARY OF THE INVENTION

The object of the present invention is to provide an intake air amount detecting system in which the delay in the value of air flow rate represented by a current for maintaining the sensor temperature constant does not give rise to the occurrence of error in detecting the intake air amount. Namely, the intake air amount detecting system of the present invention prevents the occurrence of error that hinders accurate control of the engine, and therefore, features a practically high detecting precision.

If an electrically heated resistor is disposed in the stream of air, and if the temperature of the resistor is maintained constant, there holds the following relationship is established between the air flow rate $q_a$ and the heating current I under a steady-state condition, $$I^2 = a + b\sqrt{q_a} \quad (1)$$

a: constant
b: constant

Under a non-steady-state condition in which the air flow rate changes, on the other hand, the following equation holds true between the air flow rate $q_a$ and the heating current I, if the thermal capacity of the resistor is denoted by C, $$I^2 + K_C \frac{dI}{dt} = a + b\sqrt{q_a} \quad (2)$$

The equation (2) can be modified to obtain the following equation, $$(I^2 - a)^2 + 2KC(I^2 - a)\frac{dI}{dt} + KC^2\left(\frac{dI}{dt}\right)^2 = b^2 q_a \quad (3)$$

In the equation (3), the second and third terms on the left side represent the delay in the response of the heating current I with respect to the change in the air flow rate $q_a$.

Here, the heating current is more delayed when the air flow rate increases than when the air flow rate decreases. This is explained by the fact that the second term and the third term on the left side of the equation (3) assume the same sign when the air flow rate increases, and assume different signs when the air flow rate decreases.

In the system for detecting the intake air amount by detecting the heating current, what is a problem is that when the air flow undergoes pulsation due to the delay in response, the detection signal represents a value that is smaller than that of the practical air flow rate. This error is not constantly produced, but is produced only when the air flow undergoes pulsation. Accordingly, the error presents a serious problem when the detection signal is to be used for controlling the amount of fuel injection.

The feature of the present invention, therefore, is to prevent the occurrence of the above-mentioned error by providing adjusting means which operates so that the response characteristics of the current for heating the temperature-dependent resistor become equal when the air flow rate is increased or is decreased.

The response characteristics of the heating current can be adjusted by either a system which takes out the output signal that represents the heating current via a transmission means that adjusts the response characteristics, or a system which has an adjusting means incorporated in the circuit which controls the heating current, in order to adjust the response characteristics of the heating current.

DESCRIPTION OF THE PREFERRED EMBODIMENTS

Figure 1:
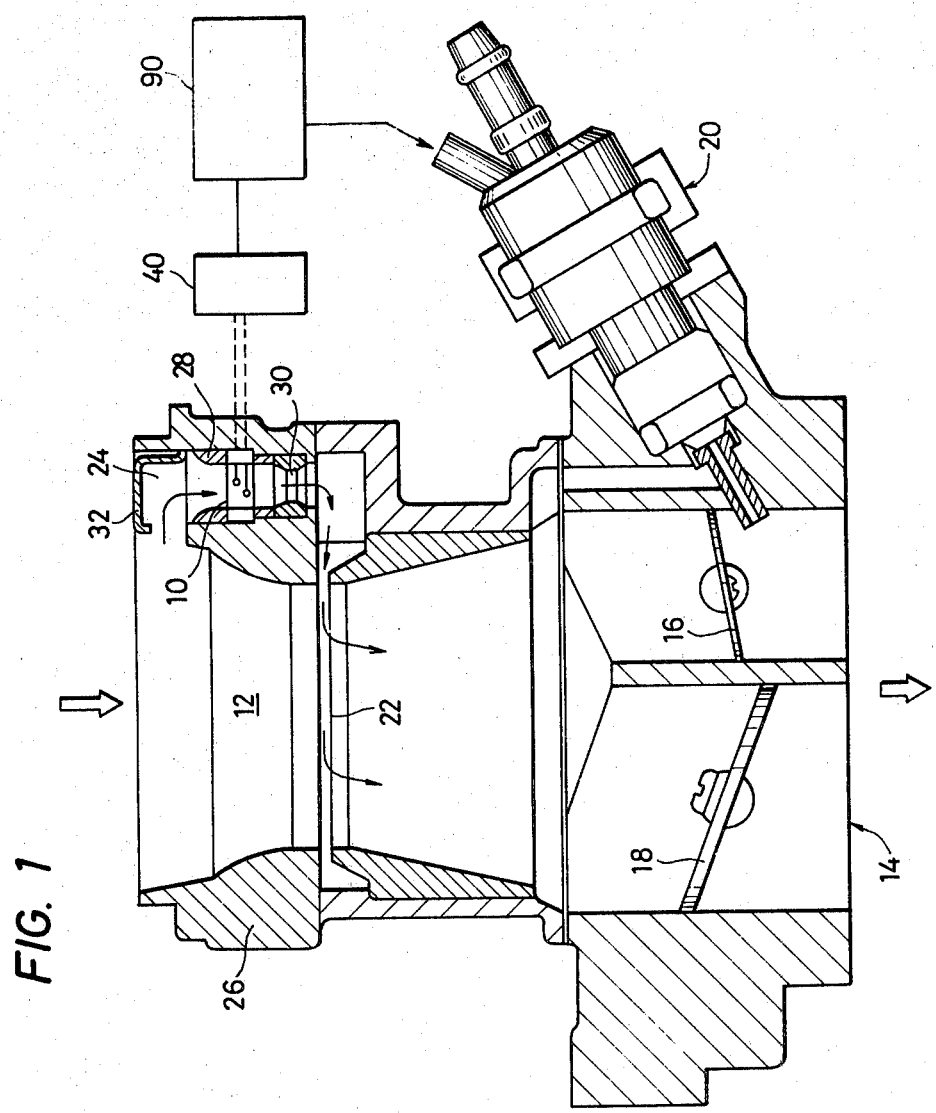
FIG. 1 is a block diagram showing the whole setup of an embodiment of the present invention.

FIG. 1 illustrates the state in which an air-flow sensor 10 is installed. A throttle chamber 14 is provided beneath a main venturi 12, and a first throttle valve 16 and a second throttle valve 18 are provided in the chamber 14. A fuel injector 20 for injecting the fuel is attached to the throttle chamber 14 downstream of the first throttle valve 16. The air is introduced through the air filter (not shown) provided upstream of the main venturi 12, passes through the main venturi 12, is admixed with the fuel injected from the injector, and is introduced into a cylinder of an internal combustion engine through the throttle valve. A portion of the intaken air flows into a by-pass 24 as indicated by the arrow due to the pressure differential between the upstream portion of the main venturi 12 and a slit 22. The by-pass 24 is provided in a portion of a venturi chamber body 26 which forms the main venturi. Namely, the air which has passed through the by-pass 24 meets the air in the main venturi 12 through the slit 22 that is formed in the circumference of the inner wall of the main venturi 12.

The intake air stream is uniformalized by an air guide plate 28 made of a metal or an insulating material installed on the upstream side of the sensor 10. Desirably, the guide plate 28 has a hole of circular shape. Therefore, the by-pass 24 should have a circular cross section. Reference numeral 30 denotes an orifice which works to set constant the ratio (flowing ratio) of the air flow rate flowing through the main venturi 12 to the air flow rate flowing through the by-pass 24. A dust cover 32 covers areas wider than that of the hole of the guide plate 28 so that dust and dirt in the intakes air will not directly enter into the by-pass 24.

The sensor 10 consists of a resistor 10w (FIG. 2) for measuring the flow speed, and a resistor $10_T$ for temperature compensation. These resistors are formed by winding a platinum wire on a ceramic support member. A sensor control circuit 40 controls the electric current which heats the resistors. The sensor control circuit 40 produces from its output terminal a sensor output signal $V_{out}$ which is temperature-compensated and response-adjusted. The output signal is fed to an engine control unit 90, which calculates the amount of the intaken air by the fourth-power operation method or the mean value operation method. The engine control unit 90 consists of a microprocessor, and performs many other functions in addition to calculating the amount of the intaken air. For example, the engine control unit 90 calculates the time for injecting the fuel from the injector 20 based upon the thus calculated amount of the intaken air.

Figure 2:
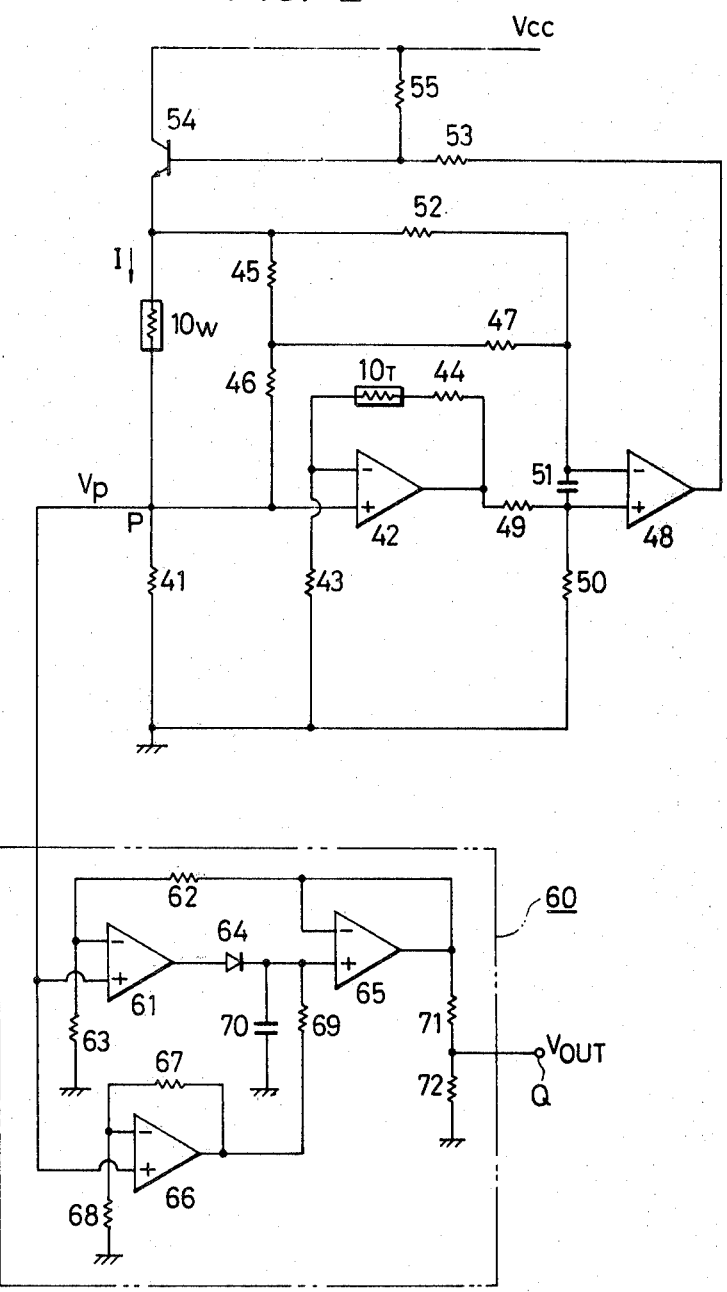
FIG. 2 is a circuit diagram of a block 40 of the embodiment of FIG. 1.
Figure 3A:
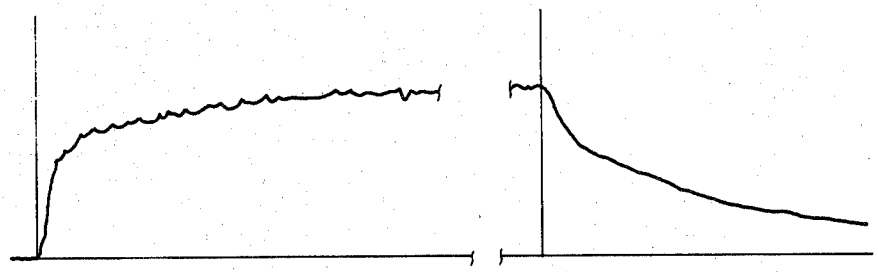
FIGS. 3a–3d illustrate time charts for comparing the characteristics of the circuit of FIG. 2 with the characteristics of a conventional circuit.
Figure 3B:
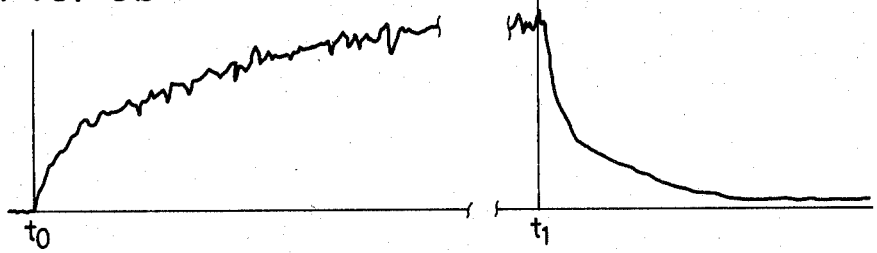
Figure 3C:
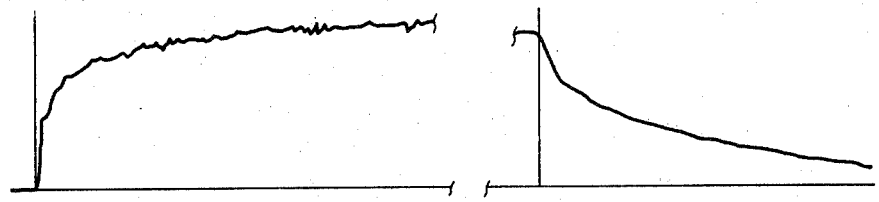
Figure 3D:
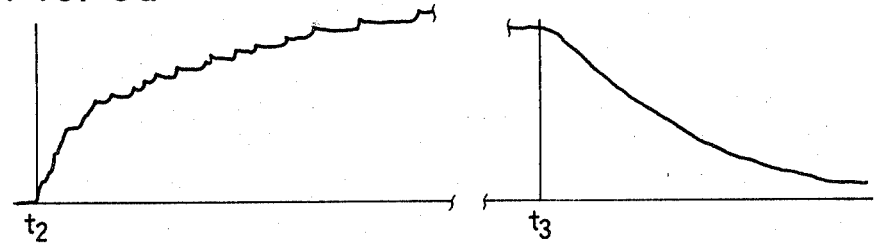

FIG. 2 shows a sensor control circuit 40 according to an embodiment of the present invention. The sensor control circuit so adjusts the heating current that the temperature of the resistor 10w for measuring the air flow speed will establish a predetermined difference from the temperature of the air. The sensor control circuit further possesses means for adjusting the response characteristics of the heating current.

A resistor 41 is connected in series with the resistor 10w for measuring the flow speed, and their connection point P is connected to a non-inversion input terminal of an operational amplifier 42. The other end of the resistor 41 is grounded, and a resistor 43 is connected between the grounded point and an inversion input terminal of the operational amplifier 42. A series circuit consisting of the resistor $10_T$ for temperature compensation and a resistor 44 is connected between the output terminal of the operational amplifier and the invention input terminal thereof. Further, a series circuit consisting of a resistor 45 and a resistor 46 is connected in parallel with the resistor 10w for measuring the air flow speed. The resistances of the two resistors 45 and 46 are significantly greater than that of the resistor 10w. A connection point between the resistor 45 and the resistor 46 is connected to an inversion input terminal of an operational amplifier 48 via a resistor 47. The output terminal of the operational amplifier 42 is connected to a non-inversion input terminal of the operational amplifier 48 via a resistor 49. Further, a resistor 50 is connected between ground and the non-inversion input terminal of the operational amplifier 48, a capacitor 51 is connected between the non-inversion input terminal and the inversion input thereof, and a resistor 52 is connected between the inversion input terminal thereof and the resistor 45. The output of the operational amplifier 48 is fed via a resistor 53 to the base of a transistor 54 that is biased through a resistor 55. The collector of the transistor 54 is connected to the power supply Vcc and the emitter is connected to one end of the resistor 10w.

The operation of the above-mentioned circuit portion will be described below. In the circuit of FIG. 2, the heating current I for the resistor 10w is so adjusted that the potential at a connection point between the resistor 45 and the resistor 46 becomes equal to the output potential of the operation amplifier 42. Therefore, the following equilibrium condition holds true.

$$R_{41} \cdot (R_{44} + R_T) = \frac{R_{46}}{R_{45} + R_{46}} \cdot R_{43} \cdot R_W \quad (4)$$

where Rw denotes the resistance of the resistor 10w for measuring the air flow speed, $R_T$ denotes the resistance of the resistor $10_T$ for temperature compensation, and $R_{41}$, $R_{43}$, $R_{44}$, $R_{45}$ and $R_{46}$ denote resistances of the resistors 41, 43, 44, 45 and 46.

Here, only a very small current flows into the resistor $10_T$. Therefore, the temperature is substantially equal to the temperature of the intaken air. Accordingly, if the temperature of the intaken air is denoted by Ta, and the temperature of the resistor 10w by Tw, the resistances Rw and $R_T$ can be given by the following relations, $$R_T = R_{T0}(1 + \alpha Ta) \quad (5)$$

$$R_W = R_{W0}(1 + \alpha Tw) \quad (6)$$

where $R_{T0}$ and $R_{W0}$ denote the resistances of the resistors $10_T$ and 10w at a temperature of 0° C., and α denotes the temperature coefficient of resistance of these resistors.

From the equations (4), (5) and (6) above, the following equation holds true.

$$Tw - Ta = \frac{1}{\alpha}\left(1 - K_1 \cdot \frac{R_{43} \cdot R_{W0}}{R_{41}(R_{47} + R_{T0})}\right)(1 + \alpha Tw) \quad (7)$$

where $K_1 = \frac{R_{46}}{R_{45} + R_{46}}$

From the thermal balance of the resistor 10w, on the other hand, the following equation holds true.

$$I^2 Rw = (a + b \sqrt{q_a})(Tw - Ta)S \tag{8}$$

where $q_a$ denotes an air flow rate through the by-pass, a and b denote constants, and S denotes a surface area of the resistor 10w.

The following equation is obtained from the equations (6), (7) and (8).

$$I^2 = \frac{S}{\alpha R W_0}\left(1 - K_1 \cdot \frac{R_{43} \cdot Rw_0}{R_{41}(R_{47} + R_{T0})}\right)(a + b\sqrt{q_a}) \tag{9}$$

Therefore, $$I^2 = K_2(a + b\sqrt{q_a}) \tag{10}$$

where $K_2$ is a constant.

Using the circuit of FIG. 1, therefore, it is possible to find the air flow rate $q_a$ from the current I that flows into the resistor 10w. The current I is nearly equal to the current which flows through the resistor 41. Therefore, the voltage $V_p$ at the connection point P represents the current I.

In the circuit of FIG. 2, a response-adjusting circuit 60 is connected to the connection point P, and a potential Vout produced at the output terminal Q of the circuit 60 is used as a sensor output signal. An operation amplifier 61 which receives the potential of the connection point P forms a non-inversion amplifier circuit together with resistors 62 and 63, and its output is fed to a buffer amplifier 65 through a diode 64. Further, an operational amplifier 66 which receives the potential of the connection point P also forms a non-inversion amplifier circuit together with resistors 67 and 68, and its output is fed to the buffer amplifier 65 via a resistor 69. A capacitor 70 is connected between ground and a connection point of diode 64 and resistor 69. When the air flow rate $q_a$ increases, the capacitor 70 is electrically charged by the output of the operational amplifier 61. Therefore, the potential at the connection point P appears at the output terminal Q without delay. When the air flow rate $q_a$ decreases, on the other hand, a difference develops between the charging potential of the capacitor 70 and the potential at the output terminal of the operational amplifier 61 or 66. The discharge due to the above potential difference is carried out through the resistor 67. Therefore, the potential decreases according to a time constant determined by the resistor 67 and the capacitor 70. Accordingly, the voltage Vout which appears at the output terminal Q lags by a factor of the first order behind the change in the heating current I.

The output Q of the above sensor control circuit is connected to an engine control unit 80 which reads the output voltage Vout of the sensor control circuit at a period related to the running speed of the engine, and which calculates the intake air flow rate $q_a$ at an instant moment in accordance with the following equation, $$q_a = (Vout^2 - C)^2 \tag{11}$$

The engine control unit further calculates an intake air flow rate by finding an average value $q_a$ of a cylinder of the engine during a period of an intake stroke. The thus constructed engine control unit has been mentioned in detail in U.S. Patent application Ser. No. 218,671.

Diagrams a, b, c and d of FIG. 3 show the experimental results which help confirm the effects of the embodiment of FIG. 2. According to this experiment, the venturi chamber body 26 of FIG. 1 is mounted on the inlet port of the air duct which is placed in a predetermined negative-pressure condition, and the air stream which flows through the venturi is permitted to flow or interrupted by an electromagnetic valve that is disposed in the duct. The diagram a of FIG. 3 shows the response of the heating current I when the speed of air flow is raised at $t_0$ and is broken at $t_1$. Further, the diagram b of FIG. 3 shows a response of a signal when the heating current is converted directly into the speed of air flow responsive to the diagram a of FIG. 3. This signal is obtained by preparing an analog circuit which performs the arithmetic operation according to the equation (11), and by applying a voltage $V_P$ at the point P of FIG. 2 to the analog circuit. The diagram d of FIG. 3 shows the response of a signal when the output Vout of the response-adjusting circuit 60 of FIG. 2 is converted to the speed of air flow by the above-mentioned analog circuit responsive to the heating current I which is shown in the diagram c of FIG. 3. Referring to the diagram b of FIG. 3, the breaking response is quicker than the rising response. Referring to the diagram d of FIG. 3, on the other hand, the breaking response is nearly equal to the rising response.

Figure 4:
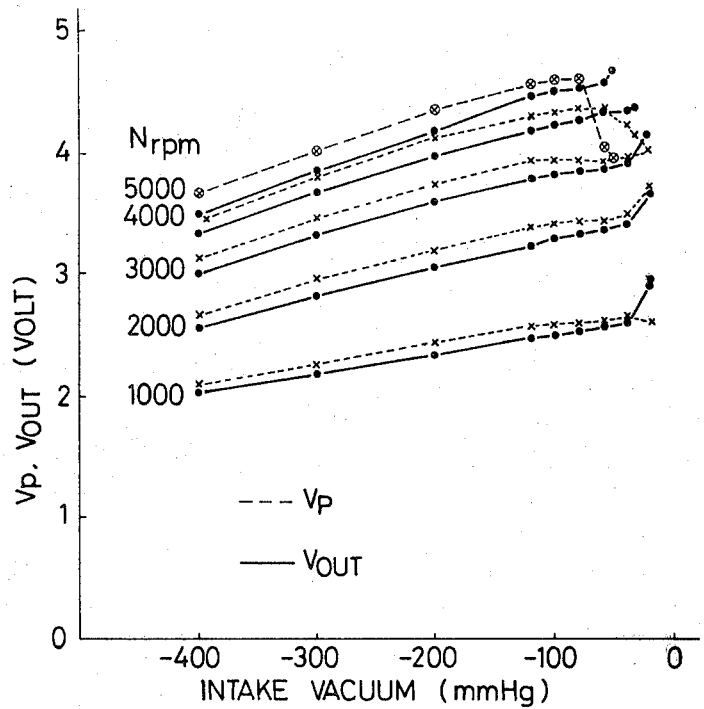
FIG. 4 is a diagram showing the characteristics of the circuit of FIG. 2.

FIG. 4 shows measured results of voltages $V_P$ and Vout of the circuit of FIG. 2 relative to the intake vacuum of the engine with the running speed N of the engine as a parameter. When the running speed remains constant, the intake air flow rate increases as the intake vacuum approaches zero, i.e., as the throttle is opened and, hence, the values $V_P$ and Vout increase correspondingly. Referring to FIG. 4, however, the value $V_P$ decreases as the intake vacuum approaches zero in the vicinity where the intake vacuum is close to zero, with the engine running at a speed of 5000 rpm or 4000 rpm. This is attributed to the fact that the air stream intake by the engine pulsates vigorously in this region, and error is developed by the difference in response of the heating current of the sensor toward the increasing direction or decreasing direction.

The output voltage Vout after the response characteristics have been adjusted, does not develop such a particular phenomenon. It is therefore considered that the error is compensated and the intake air flow rate is correctly indicated by the output voltage Vout.

Figure 5:
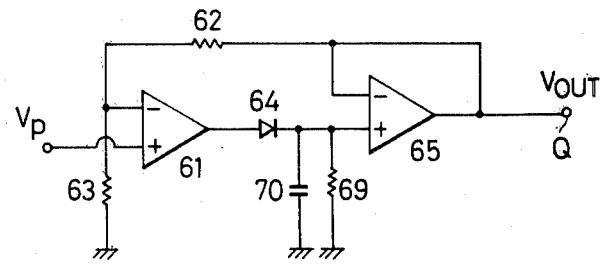
FIG. 5 is a diagram of a circuit 60 of FIG. 2 according to another embodiment.

FIG. 5 shows another response-adjusting circuit which can be used in place of the response-adjusting circuit 60 of the embodiment of FIG. 2. The circuit of FIG. 5 is different from the circuit 60 of FIG. 2 in that it does not have the non-inversion amplifier circuit 66 and that one end of the resistor 69 is gounded. When the input potential $V_P$ rises, the circuit operates quite in the same manner as the circuit 60; the change in the input potential appears on the output terminal Q without delay. When the input potential $V_P$ decreases, on the other hand, the electric charge stored in the capacitor 70 is discharged to ground via the resistor 69. Therefore, the output voltage Vout that appears on the output terminal Q of the buffer amplifier 65 drops describing a predetermined waveform according to a time constant determined by the capacitor 70 and the resistor 69.

Figure 6:
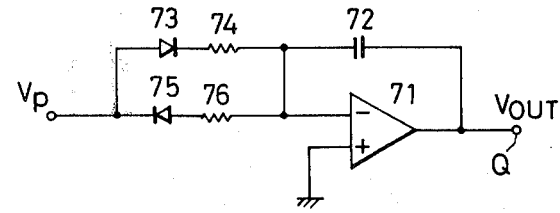
FIG. 6 is a diagram of the circuit 60 of FIG. 2 according to a further embodiment.

FIG. 6 shows still another response-adjusting circuit. This circuit consists of a so-called Miller integrator. A capacitor is connected between the output terminal and the inversion input terminal of an operational amplifier 71, and a series circuit consisting of a forwardly connected diode 73 and a resistor 74, and a series circuit consisting of a reversely connected diode 75 and a resistor 76, are connected in parallel to the input terminal of the operational amplifier 71. When the input potential $V_P$ rises, the capacitor 72 is charged according to a time constant determined by the resistor 74 and the capacitor 72. When the input potential drops, the electric charge stored in the capacitor 72 is discharged according to a time constant determined by the resistor 76 and the capacitor 72. Therefore, the voltage Vout appearing at the output terminal Q exhibits different response characteristics depending upon whether the input potential $V_P$ rises or lowers.

Figure 7:
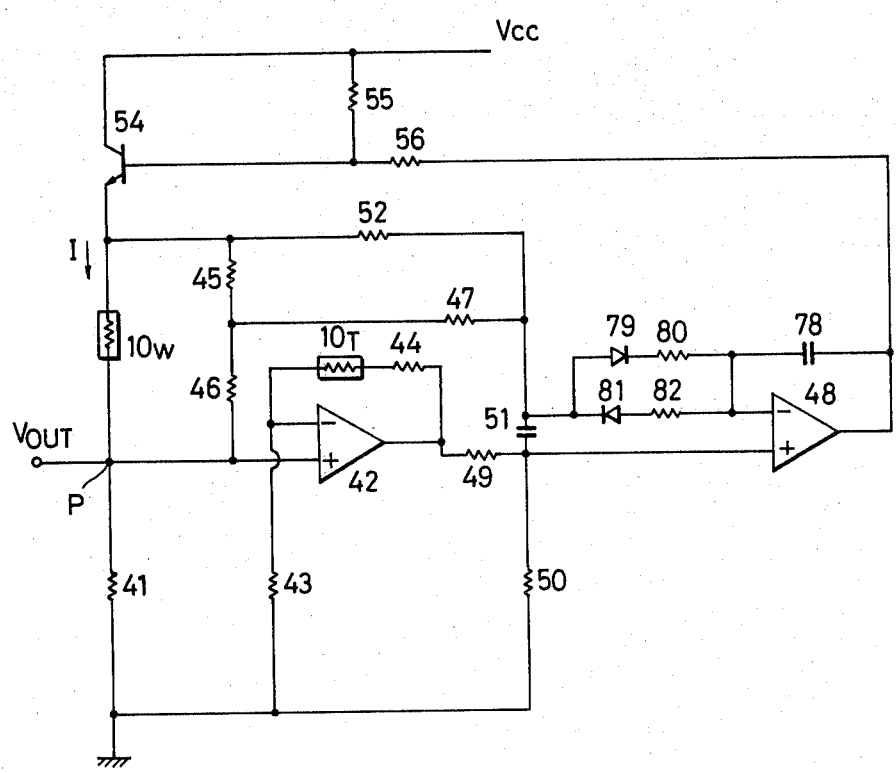
FIG. 7 is a diagram of the circuit of FIG. 2 according to yet another embodiment.

FIG. 7 shows the sensor control circuit according to yet a further embodiment. A series circuit consisting of a forwardly connected diode 79 and a resistor 80, and a series circuit consisting of a reversely connected diode 81 and a resistor 82, are connected to the input terminal of the operational amplifier 48. Further, a capacitor 78 is connected between the output terminal and the input terminal of the operational amplifier 48. Other portions of the circuit are the same as those of the circuit of FIG. 2. When the air flow rate increases, the output potential of the operational amplifier 48 rises according to a time constant determined by the resistor 82 and the capacitor 78, and the heating current I increases. When the air flow rate decreases, on the other hand, the output potential of the operational amplifier 48 decreases according to a time constant determined by the resistor 80 and the capacitor 78, and the heating current I decreases. Therefore, by adjusting the resistances of the resistors 80 and 82, it is possible to adjust the response of the heating current I. Consequently, the potential at the point P can be used as a sensor output signal Vout.

Figure 8:
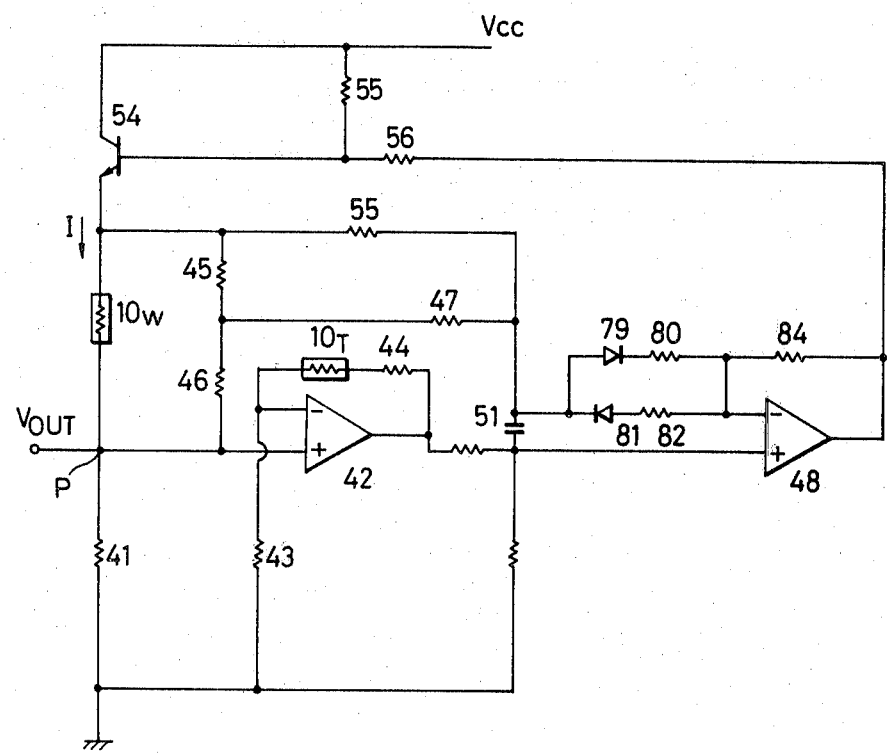
FIG. 8 is a diagram of the circuit of FIG. 2 according to still further embodiment.

FIG. 8 shows the sensor control circuit according to still another embodiment. What makes the circuit of FIG. 8 different from the circuit of FIG. 7 is that the feedback circuit of the operational amplifier 48 is formed by a resistor 84 instead of the capacitor 78. According to this circuit, the gain of a differential amplifier set up by the operational amplifier 48 changes depending upon whether the air flow rate increases or decreases. Therefore, the response of the heating current I can be adjusted like the circuit of FIG. 7.

All of the above-mentioned embodiments employ a sensor control circuit which controls the heating current by comparing an output potential of a non-inversion amplifier circuit which has a temperature-compensating resistor in a feedback circuit with a potential that is obtained by dividing the potential of a air flow-speed measuring resistor by a resistor. However, the present invention may employ any sensor control circuit which detects the change in the resistance of a resistor for measuring the air flow speed to control the heating current that flows to said resistor, in order to maintain the temperature of the resistor constant. Usually, a Wheatstone bridge circuit is used which has in one side thereof a resistor for measuring the air flow speed.

What is claimed is:

1. An intake air amount detecting system for internal combustion engines comprising in combination:
  (a) at least one temperature-dependent resistor disposed in an intake air path of the internal combustion engine;
  (b) power-supply means for feeding a heating current to said temperature-dependent resistor;
  (c) feedback means which adjusts said heating current in response to the change in resistance of said temperature-dependent resistor so as to maintain the temperature of said temperature-dependent resistor constant;
  (d) signal adjusting means connected to receive a signal that represents said heating current for adjusting said signal to lag more when the signal decreases than when the signal rises; and
  (e) converter means connected to the output of said signal adjusting means for converting said output into a signal representing the intake air flow rate of the internal combustion engine.

2. An intake air amount detecting system for internal combustion engines according to claim 1, wherein said signal adjusting means includes a current delay element that is effective only when said heating current decreases.

3. An intake air amount detecting system for internal combustion engines according to claim 1, wherein said signal adjusting means includes a Miller integrator that exhibits different integration time constants depending upon whether the input signal increases or decreases.

4. An intake air amount detecting system for internal combustion engines according to any one of claims 1 to 3, wherein said feedback means includes temperature-compensation means which compensates said heating current depending upon the temperature of said intaken air.

5. An intake air amount detecting system for internal combustion engines comprising in combination:
  (a) at least one temperature-dependent resistor disposed in an intake air path of the internal combustion engine;
  (b) power-supply means for feeding a heating current to said temperature-dependent resistor;
  (c) feedback means which adjusts said heating current responsive to the change in resistance of said temperature-dependent resistor so as to maintain the temperature of said temperature-dependent resistor constant;
  (d) response-adjusting means for controlling said feedback means to cause the response thereof to be more lagged when said heating current decreases than when said heating current increases; and
  (e) converter means responsive to said heating current for converting the value thereof to correspond to the intake air flow rate of said internal combustion engine.

6. An intake air amount detecting system for internal combustion engines according to claim 5, wherein said response-adjusting means forms part of said feedback means and includes adjusting means for adjusting the response of a signal applied thereto depending upon whether the input signal rises or breaks.

7. An intake air amount detecting system for internal combustion engines according to claim 5, wherein said response-adjusting means consists of a circuit which changes the gain of said feedback means depending upon whether said heating current increases or decreases.

8. An intake air amount detecting system for internal combustion engines according to claim 5, wherein said response-adjusting means comprises a Miller integrator that exhibits different integration time constants depending upon whether the signal applied thereto increases or decreases, said response-adjusting means being connected as part of said feedback means.

* * * * *